Patented June 11, 1940

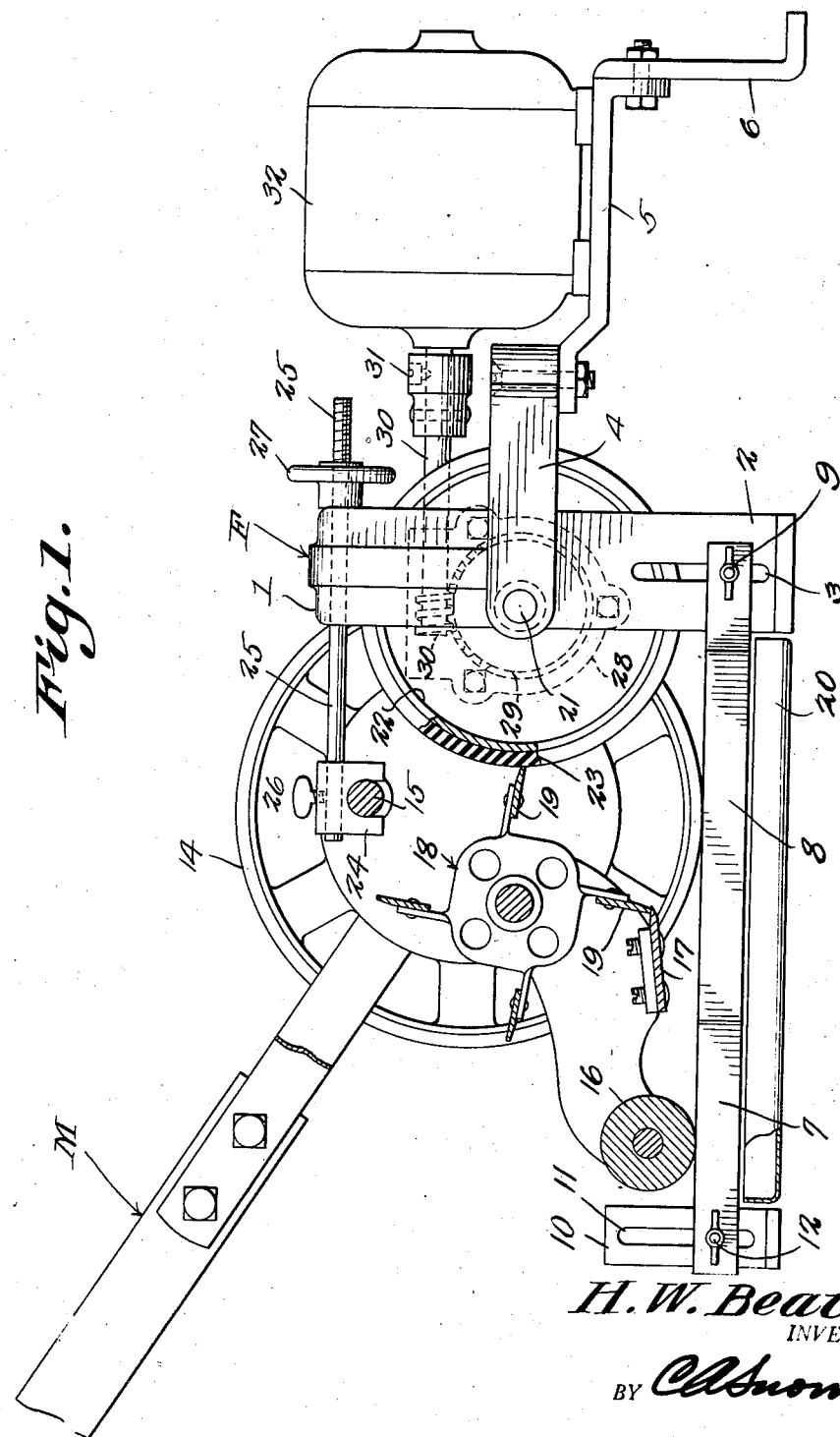

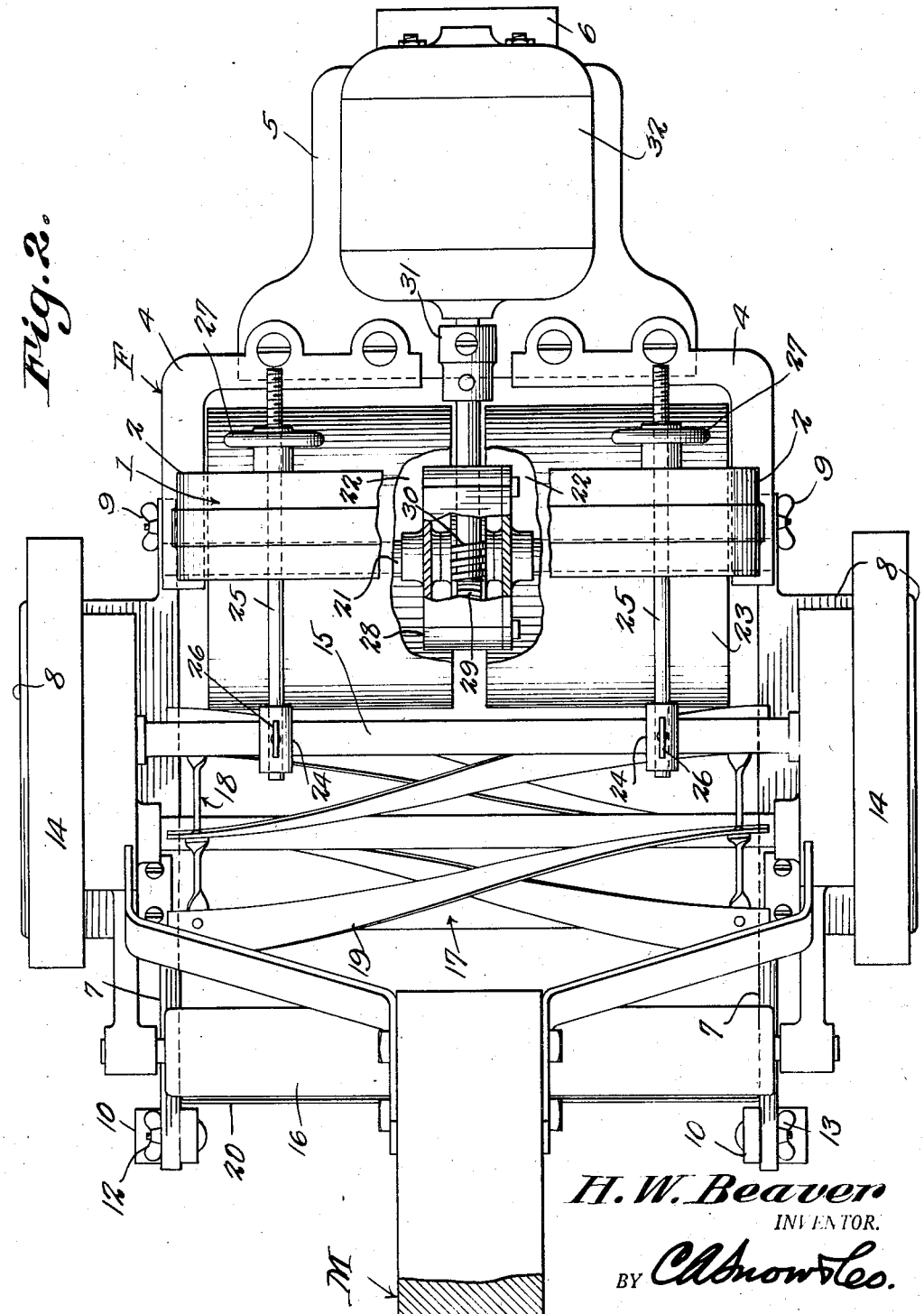

2,204,293

UNITED STATES PATENT OFFICE 2,204,293

LAWN MOWER SHARPENER

Hartsell W. Beaver, Statesville, N. C.

Application May 12, 1939, Serial No. 273,317

7 Claims. (Cl. 51—26)

This invention aims to provide novel means for supporting and anchoring a lawn mower, and to provide novel means for turning the cutting rotor of the mower, to the end that emery or some other abrasive substance, placed on the fixed shear of the mower, will cooperate with the blades of the rotor, to sharpen both the shear and the blades.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 is a side elevation, wherein parts are sectioned;

Fig. 2 is a top plan in which parts are broken away.

In carrying out the invention there is provided a frame F, including a vertical arch 1 having legs 2, provided with vertical slots 3. Horizontal angle brackets 4 are secured to the legs 2, and to the inwardly projecting arms of the angle brackets, a horizontal table 5 is rigidly secured, the forward end of the table carrying a leg 6, the legs 2 and 6 giving a three-point support support for the frame F.

A mower mount is supplied and includes parallel side bars 7 having outwardly projecting lateral extensions 8. The forward ends of the side bars 7 are connected to the legs 2 by wing bolts 9 located in the slots 3 of the legs 2. Legs 10 are provided, and have vertical slots 11, receiving wing bolts 12 mounted in the side bars 7. The mower mount, in view of the foregoing description, is vertically adjustable, in order to position properly, the mower which it carries.

The mower is designated by the letter M and includes ground wheels 14, a cross rod 15, a ground-engaging roller 16, a fixed shear 17, and a rotor 18, including spiral blades 19, which cooperate with the fixed shear 17 in a well known manner.

The ground wheels 14 of the mower M rest on the extensions 8 of the side bars 7 of the mower mount, the ground-engaging roller 16 resting on the side bars 7.

The grinding operation is carried out by putting abrasive material, such as emery dust, on the fixed shear 17, rotation being imparted to the member 18, both the blades 19 and the shear 17 being sharpened at once, as the blades sweep over the shear 17, laden with emery dust. The dust falls into a removable pan 20, located beneath the side bars 7 of the motor mount.

As to the means whereby the rotor 18 is caused to turn, a driven shaft 21 is journaled in the brackets 4 and in the legs 2. The shaft 21 is secured to the outer heads of driving drums 22, the drums being open at their inner ends, and being spaced apart at their inner ends. The drums 22 are provided with friction coverings 23, made of rubber or the like and adapted to secure a good hold on the blades 19, so that when the drums 22 are turned, rotation will be imparted to the rotor 18, the blades 19 moving over the shear 17, and sharpening being effective in the manner hereinbefore pointed out.

In order to secure an intimate driving contact between the coverings 23 of the drums 22 and the blades 19 of the rotor 18, the cross rod 15 of the mower is received in notched saddles 24, held on draw rods 25, for adjustment longitudinally thereof, through the instrumentality of set screws 26. The draw rods 25 have longitudinal movement in the upper portion of the arch 1, but the rods are threaded at their front ends to cooperate with tightening wheels 27, which, engaging the arch 1, advance the rods 25 and the saddles 24, and cause the blades 19 of the rotor 18 to have driving engagement with the coverings 23 of the drums 22.

A gear housing 28 is supported by the shaft 21, and the shaft 21 turns in the gear housing. Since the drums 22 are open at their inner ends, they receive and accommodate the gear housing 28, as Fig. 2 will show. Secured to the shaft 21, within the housing 28, is a worm wheel 29, cooperating with a worm shaft 30, arranged at right angles to the shaft 21 and supported for rotation in the housing 28, the inner ends of the drums 22 being spaced to receive the worm shaft 30. A coupling 31 connects the worm shaft 30 with the shaft of an electric motor 32, secured to the table 5.

The motor 32 turns the worm shaft 30, the worm shaft drives the shaft 21 by way of the worm wheel 29, the shaft 21 rotates the drums 22, the facings 23 impart rotation to the member 18, by contact with the blades 19, and as the blades sweep over the emery-laden shear 17, a sharpening of both the shear and the blades 19 is effected.

The device is simple in construction, but will carry out a lawn mower sharpening operation in a satisfactory and expeditious manner.

Having thus described the invention, what is claimed is:

1. In a machine for sharpening a lawn mower by cooperation between the blades of the rotary cutter and the shear of the mower, a frame, a mower mount associated with the frame, a rotary driven member journaled on the frame, means for holding the blades of the rotary cutter of a mower carried by the mount, in engagement with the periphery of the driven member, and means for rotating the driven member.

2. In a machine for sharpening a lawn mower by cooperation between the blades of the rotary cutter and the shear of the mower, a frame, a mower mount associated with the frame, a rotary driven member journaled on the frame, means for holding the blades of the rotary cutter of a mower carried by the mount, in engagement with the periphery of the driven member, a motor mounted on the frame, and a driving connection between the motor and the driven member.

3. In a machine for sharpening a lawn mower by cooperation between the blades of the rotary cutter and the shear of the mower, a frame including an upright member, a mower mount associated with the upright member, a rotary driven member journaled on the upright member, means adjustable in the upright member for holding the blades of the rotary cutter of a mower carried by the mount, in engagement with the periphery of the driven member, a motor, means for supporting the motor from the upright member, the last-specified means, and the upright member forming a support for the machine, and a driving connection between the motor and the driven member.

4. In a machine for sharpening a lawn mower by cooperation between the rotary cutter and the shear of the mower, a frame, a mower mount associated with the frame, a first shaft journaled in the frame, drums secured to the first shaft and separated at their inner ends to form a space, means for holding the rotary cutter of a mower carried by the mount, in engagement with the drums, a second shaft supported for rotation in said space, a driving connection between the shafts and located in said space, and means for rotating the second shaft.

5. In a machine for sharpening a lawn mower by cooperation between the rotary cutter and the shear of the mower, a frame, a mower mount associated with the frame, a first shaft journaled in the frame, hollow drums secured to the first shaft and separated at their inner ends to form a space, means for holding the rotary cutter of a mower carried by the mount, in engagement with the drums, a gear housing carried by the first shaft and accommodated within the inner ends of the drums, a second shaft supported for rotation in the gear housing and extended into said space, gearing connecting the shafts and disposed within the gear housing, and means for rotating the second shaft.

6. In a machine for sharpening a lawn mower by cooperation between the rotary cutter and the shear of the mower, a frame, a mower mount, a rotary driven member journaled on the frame, means for holding the rotary cutter of a mower carried by the mount, in engagement with the driven member, means for rotating the driven member, and means for connecting the mount with the frame, for raising and lowering, thereby to position the rotary cutter of a mower for engagement with the driven member, at the periphery of the driven member.

7. In a machine for sharpening a lawn mower by cooperation between the rotary cutter and the shear of the mower, a frame, a mower mount associated with the frame, a rotary driven member journaled on the frame and having a resilient friction covering, means for holding the rotary cutter of a mower carried by the mount, in engagement with the covering, and means for rotating the driven member.

HARTSELL W. BEAVER.